United States Patent [19]
Savit

[11] Patent Number: 4,639,729
[45] Date of Patent: Jan. 27, 1987

[54] TELEMETRIC SYSTEM
[75] Inventor: Carl H. Savit, Houston, Tex.
[73] Assignee: Western Geophysical Company of America, Houston, Tex.
[21] Appl. No.: 779,073
[22] Filed: Sep. 23, 1985
[51] Int. Cl.[4] ............................................. G08C 19/16
[52] U.S. Cl. .................................. 340/870.13; 367/79
[58] Field of Search ................... 340/870.13, 870.14, 340/870.41; 367/79, 37, 76, 78; 370/4

[56] References Cited
U.S. PATENT DOCUMENTS
4,313,192  1/1982  Nelson et al. .................... 367/79 X Primary Examiner—Jerry W. Myracle
Attorney, Agent, or Firm—Barry C. Kane; Robert E. Lowe; William A. Knox

[57] ABSTRACT

In a two-stage, time-division multiplexing method and apparatus, a plurality of sensors are disposed at equal intervals along a plurality of transmission channels. An interrogation signal is transmitted from a recording station to all of the sensors along each channel. Because of the spatial arrangement of each sensor along the telemetric system and different propagation path lengths along each channel, the output signals from the sensors are time-division multiplexed along each channel. The multiplexed signals along each channel are time-division multiplexed a second time upon arrival at the recording station where the signals from each channel are interleaved with each other.

9 Claims, 6 Drawing Figures

TELEMETRIC SYSTEM

BACKGROUND OF THE INVENTION

1. Field of the Invention

This invention relates to data telemetry and particularly as applied to seismic exploration.

2. Discussion of the Prior Art

The term "light" as used herein is intended to encompass visible light as well as radiation in other parts of the spectrum that may be propagated by optical waveguides.

In seismic exploration, acoustic signals are injected into the earth from a location at or near the surface. The injected acoustic signals propagate downward and are reflected from structures in the subsurface. The reflected acoustic signals return to the earth's surface where they are detected by a plurality of seismic sensors or sensor groups. The sensors are normally deployed along a surveyed line and are spaced tens or hundreds of feet apart along a length of cable. As many as a thousand or more sensors may be distributed over such a cable which may be three miles or more long.

The acoustic signals received by the sensors are transformed into electrical or optical signals and transmitted to a central signal-recording station. In accordance with conventional seismic surveying practice, each sensor is located along the survey line at increasingly greater distances from the recording station.

Technologically-old seismic data-transmission systems include a plurality of sensors disposed along a cable at predetermined spacings. Each sensor transmits data to a remote recording device through a physically separate transmission line. Because of increasingly longer cables having many more sensors, separate transmission-line cables became physically cumbersome to handle.

Time-division multiplexed (TDM) systems were developed to reduce the large number of transmission lines to a mere handful and yet maintain sensor distribution density. TDM sensors are spaced at predetermined distances along each transmission line such that the data transmitted by each sensor to the recording device will not overlap data from adjacent sensors on the same line. The TDM data propagating on each line are received at the recording device and demultiplexed in channel-sequential or sample-sequential order well known in the art.

In electrical telemetric systems, the recording station polls each sensor in sequence and identifies each individual sensor by an address to that sensor. Alternatively, various clocking schemes have been developed whereby each sensor has a response to one or more clocking signals emitted by the recording station.

In optical telemetric systems, the recording station launches a light pulse of predetermined width into a trunk transmission line. As the light pulse propagates down the trunk line, a portion of the light pulse energy enters each sensor where it is modulated and passed back into the trunk line but in the opposite direction. The time delay due to the propagating distance between sensors provides a time window during which each sensor can transmit data, thus providing a time-division multiplexed optical signal. The modulated light pulses from each sensor are sequentially received and demultiplexed at the recording station. Individual sensors are recognized by the arrival sequence of their signal.

The above telemetric systems have several disadvantages. Electrical telemetric systems require complicated circuits so that each sensor or sensor group is able to recognize its particular address or clock pulse. Optical systems do not require addressed sensors. However, signal attenuation is a problem resulting from the large number of optical couplers connecting the sensors to the trunk line. Signal loss is compounded when the system is comprised of several sections.

It is an object of this invention to provide a new multiplexing method and system for reducing signal loss in optical telemetric systems.

It is another object of this invention to reduce the number of sensors per telemetry channel while maintaining sensor density along the line of survey.

It is yet another object of this invention to provide a two-stage, multiplexed telemetric system wherein each channel has a time-division multiplexed signal propagating therethrough and wherein the output of the sensors on each channel are staggered with respect to each other.

SUMMARY OF THE INVENTION

An improved method and apparatus for the time-division multiplexing of data propagating through a cable having a plurality of optical waveguides. Each of the waveguides has a plurality of sensors attached thereto at regular intervals with the spacing interval on each waveguide partially overlapping the others.

In another embodiment of this invention, a plurality of sensors constituting a group are connected to each waveguide. The spacing distance is constant between successive sensors on each waveguide. A first group of sensors are disposed along a first waveguide proximate the recording unit. A second group are disposed along a second waveguide immediately beyond the first group. A third group of sensors are positioned along a third waveguide immediately beyond the second group, and so on.

For systems having sensors physically located the same distance from the recording unit, each waveguide has a successively greater length of fiber-optic coil interconnecting the waveguide with the recording unit such that signals from the shortest fibers will be received first.

Each of the above systems provide a staggered, time-division multiplexed telemetric system.

DETAILED DESCRIPTION OF THE PREFERRED EMBODIMENT

Figure 1:
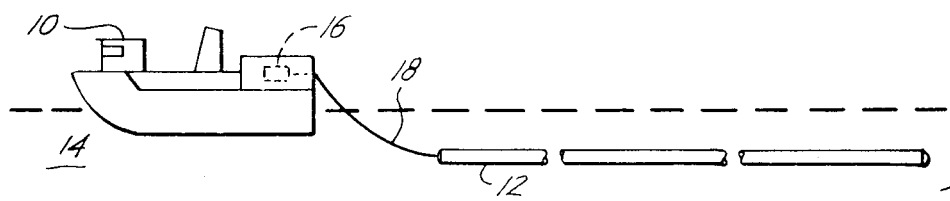
FIG. 1 is a simple schematic of a telemetric system.

FIGS. 1-4 are schematic illustrations of a preferred embodiment of the instant invention wherein FIG. 1 is a general elevational side view of a ship 10 towing a seismic streamer 12 through a body of water 14.

Streamer cable 12 is connected to a remote recording unit 16 aboard the ship 10 via a transmission bundle 18.

Figure 2:
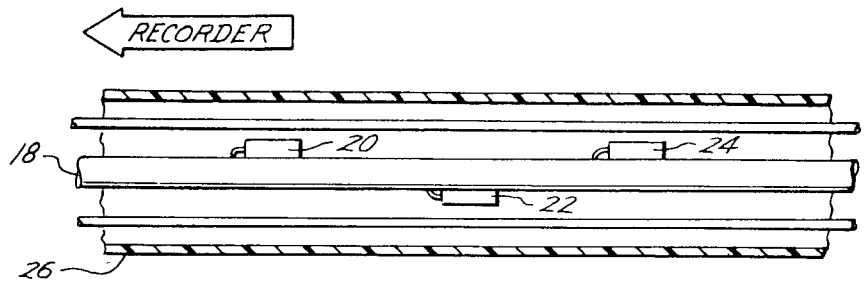
FIG. 2 is a schematic of a portion of a telemetric cable.

FIG. 2 is a longitudinal cross-sectional view of a portion of streamer cable 12 wherein the transmission bundle 18 is shown having a plurality of sensors such as 20, 22, and 24 attached thereto at regular intervals. Bundle 18 and sensors such as 20, 22, and 24 are disposed within a cylindrical, flexible jacket 26 made of polyvinyl chloride or like material. The streamer cable 12 is closed at both ends and typically filled with a dielectric petroleum distillate such as white kerosene to give the cable 12 neutral buoyancy while in the water 14.

Figure 3:
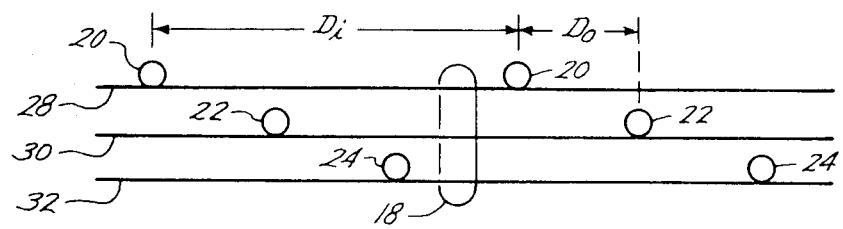
FIG. 3 is a schematic illustration of a portion of a transmission bundle and associated sensors.

FIG. 3 is a schematic representation of a portion of transmission bundle 18 and sensors 20, 22, and 24. Bundle 18 consists of a plurality of transmission channels such as waveguides 28, 30, and 32 which extend along the length of cable 12 and one end of each is coupled to the remote recording unit 16 aboard the ship 10. Disposed along the length of each waveguide 28, 30, and 32 at regular intervals $D_i$ away from the recording unit are the sensors such as 20, 22, and 24 respectively. Sensors 20, 22, and 24, may be optical sensors, such as fiber-optic coil resonators uni-directionally coupled to each waveguide, or optically-compatible sensors such as conventional electrical sensors connected to an optical signal receiving and transmitting package. Optically-compatible sensor packages are powered by electrical conductors extending along the length of cable 12.

In one embodiment of this invention, the sensors 20, 22, and 24 are spaced at regular intervals $D_i$ along each waveguide 28, 30 and 32 respectively, no two sensors occupy the same location along the cable 12. That is to say that the sensors 20, 22, and 24 nearest the recording unit on each waveguide 28, 30, and 32 are offset with respect to the others by a predetermined distance, $D_o$. For example, the offset distance $D_o$ between sensor 20 on waveguide 28 and the next sensor 22 on waveguide 30, is such that the time required to traverse that distance is slightly greater than the length of time a data bit or word takes to pass a given point on the waveguide at the velocity of light in the waveguide. It is understood that, if necessary, the optical length of the transmission lines between sensors may be substantially greater than the physical distance between the same sensors to provide additional transmission time.

Figure 4:
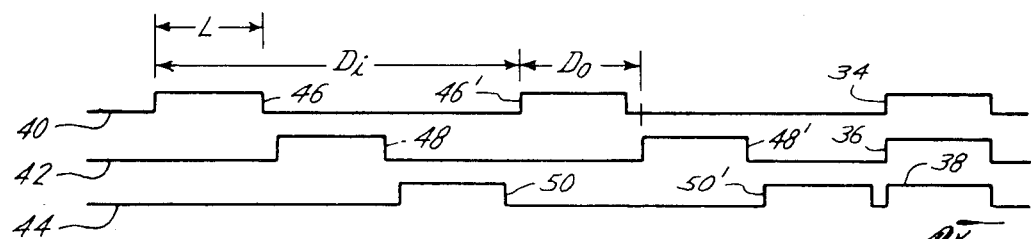
FIG. 4 is a timing diagram of the multiplexed telemetric system of this invention.

Refer to FIG. 4 where interrogation light pulses 34, 36, and 38 are shown as having propagated from left to right down each waveguide 40, 42, and 44 respectively. Assume the recording unit 16 is to the left of FIG. 4. An equal portion of the light-pulse energy 46, 48, and 50 has entered each sensor 20, 22, and 24 where it has been modulated by a received seismic signal and retransmitted back into the waveguide in the reverse direction. As shown in FIG. 4, the modulated light pulses 46, 48, and 50 from each sensor 20, 22, and 24 are offset with respect to the next farthest sensor away from the recording unit 16 by the offset distance $D_o$. The interval $D_i$ between light pulses 46, 48, and 50 on the same waveguide is the product of the offset distance $D_o$ and the number of waveguides 28, 30, and 32 employed in the system.

In operation, a interrogation light pulses 34, 36, and 38 of predetermined width are simultaneously launched by a light source, such as a pulse laser within the remote recording unit 16, into each waveguide 28, 30, and 32 within bundle 18. An optical pulse 34, 36, and 38 propagates down each waveguide 28, 30, and 32 at the same velocity but reaches each sensor 20, 22, and 24 at different times because of the predetermined offset $D_o$. A predetermined portion of the light-pulse energy such as 46, 48, and 50 enters each sensor 20, 22, and 24 as the light pulse 34, 36, and 38 propagates down each waveguide. The light pulse 46, 48, and 50 propagating within each sensor is modulated according to the received seismic signal. The light pulse 46, 48, and 50 may be phase modulated, or frequency modulated as may be appropriate for the type of sensors and recording system employed. Each modulated light pulse 46, 48, and 50 exits each sensor and is redirected back into each waveguide 28, 30, and 32, but in the opposite direction. Because of the spacing interval between sensors 20, 22, and 24 on each waveguide 28, 30, and 32 the modulated pulses 46, 48 and 50 from each sensor 20, 22, and 24 are time-division multiplexed as shown in FIG. 4. The TDM pulses on each waveguide 28, 30, and 32 propagate back to the recording device where they are received by a suitable photo-detector. Because of the offset distance $D_o$ between sensors 20 on waveguide 28, sensors 22 on waveguide 30 and sensors 24 on waveguide 32 the pulses arriving at the recording unit 16 are again time-division multiplexed, thus an improved time-division multiplexed telemetric system is provided.

The remote recording system 16 contains the appropriate circuitry to generate and detect the optical signals to be used in the telemetric system. For example, assume phase modulation sensors are to be employed. A reference signal is generated within the recording unit 16 to compare with the sensor output signals for determining the amount of phase shift for each sensor.

Figure 5:
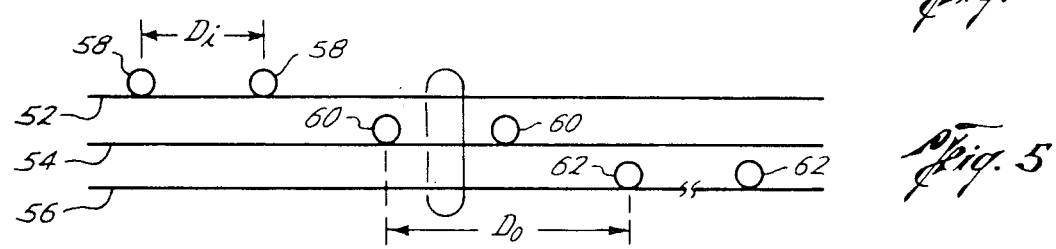
FIG. 5 is a schematic diagram of an alternate embodiment of the instant invention.
Figure 6:
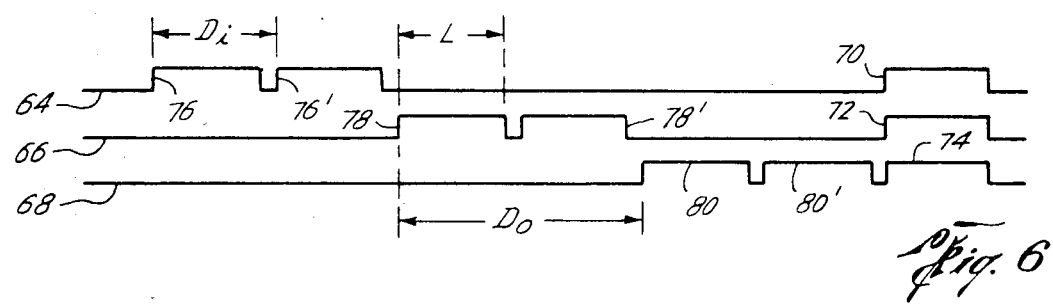
FIG. 6 is a timing diagram of the alternate embodiment.

FIG. 5 illustrates an alternate embodiment of the invention where a first waveguide 52 has arranged thereon a plurality of sensors 58 spaced at $D_i$ intervals. A second waveguide 54 has a plurality of sensors 60 similarly attached thereto, however sensors 60 are positioned further from the recording unit 16 than sensors 58. A third waveguide 56 has a plurality of sensors 62 attached thereto beyond sensors 60. In the alternate embodiment of this invention, the spacing interval $D_i$ and the offset distance $D_o$ have the same definitions, however the physical positions of the sensors 58, 60, and 62 have changed. As opposed to the individual sensors 20, 22, and 24 arranged en-echelon along the waveguides 28, 30, and 32 as shown in FIG. 3, groups of sensors such as 58, 60, and 62 are arranged en-echelon. In the alternate embodiment, the spacing interval $D_i$ may remain the same as that in FIG. 3, but the offset distance $D_o$ increases substantially depending upon the number of sensors spaced along each waveguide. In the alternate arrangement, the signals from the group of sensors nearest the recording unit will be received first. The signals from the second closest group of sensors on another waveguide will be received second, and so on.

In some seismic cables, several sensors may be collocated at each of a plurality of stations along the cable. In such a case, the lengths of the waveguides to all of the sensors at any given distance from the recording unit will be the same. To allow multiplexing in accordance with this invention, it will be necessary to provide separate waveguides for each of the collocated sensors and to insert delay lines of different lengths in each of the lines so that the staggered (or en-echelon) spacing of delays provided hereinabove can be achieved. A simple means of providing such a delay is to provide a coil in each waveguide, the coils being successively longer in increments of $D_o$ so that if the coils were stretched out, the hereinabove described pattern of lengths would be achieved.

From the above descriptions it is apparent that the physical locations of the sensors in the cable are not necessarily determinative of the signal transmission times from those sensors to the central recording station, the transmission times being determined by both the distance between sensors and the central recording station and by interposed delay lines. Differences, if any, in the velocity of light in waveguides of different composition must also be taken into account. Accordingly it is to be understood that references to intervals herein when applied to transmission channels should be understood to apply to propagation times rather than physical distances. Similarly, the term "width" when applied to data-words or signals refers to their duration.

For illustrative purposes, my invention has been described with a certain degree of specificity. Variations will occur to those skilled in the art but which may be included within the scope and spirit of this invention which is limited only by the appended claims.

I claim as my invention:

1. A telemetric system for transmitting time-division multiplexed data pulses to a central recording station, said system comprising:
   (a) a cable having a plurality of transmission channels extending the length thereof and operably coupled to said central recording station;
   (b) a plurality of sensors disposed at substantially equal intervals along each of said channels, said sensors on each channel being offset from sensors on adjacent channels by a predetermined distance;
   (c) means for time-division multiplexing a plurality of data pulses traveling on each of said channels; and
   (d) means for time-division multiplexing said multiplexed data pulses from each of said channels to said central recording station.

2. A telemetric system as defined in claim 1, wherein each of said transmission channels comprise a single optical waveguide.

3. A telemetric system as defined in claim 2, wherein each of said optical waveguides further comprises: a length of optical-fiber coil of predetermined length interconnecting each of said waveguides to said recording station, such that said data signals on each waveguide will be staggered with respect to data signals on each other waveguides, enroute to said central recording station.

4. A telemetric system as defined in claim 1, wherein said means for multiplexing a plurality of signals on each channel comprises:
   (a) said equal intervals between said sensors wherein each of said equal intervals is a distance at least equal to the product of the total number of channels in said system times the offset distance $D_o$ between sensors on adjacent waveguides.

5. A telemetric system as defined in claim 4, wherein said means for multiplexing said multiplexed signal from each of said channels to said central recording station comprises:
   (a) a first waveguide of said plurality of waveguides having a first sensor attached thereto proximate said central recording station;
   (b) a second waveguide of said plurality having a first sensor attached thereto farther from said central recording station than said first sensor on said first waveguide by said offset distance; and
   (c) a third waveguide of said plurality of waveguides having a first sensor attached thereto farther from said central recording station than said first sensor on said second waveguide by said offset distance such that signals transmitted to said central recording station from said sensors will be received sequentially, according to the distance from said central recording station.

6. A method for time-division multiplexing data from a plurality of transmission channels each having a plurality of sensors attached thereto at equal intervals from each other, wherein said sensor intervals along each channel are offset from adjacent channels by a predetermined distance, the method comprising the steps of:
   (a) launching simultaneously a light pulse into each of said transmission channels;
   (b) directing an energy portion of said pulse into each sensor, said pulse portion, reaching each sensor on each channel at a time interval determined by the pulse propagation velocity through each transmission channel;
   (c) redirecting the pulse within each sensor back into each of said transmission channels in the opposite direction in time order of receipt; and
   (d) recording said redirected pulses from each channel in order of their arrival, whereby said pulses are time-division multiplexed a second time according to arrival times.

7. A telemetric system having a plurality of transmission channels, each of said plurality of transmission channels having a plurality of sensors attached thereto at a first predetermined interval, the system comprising:
   (a) means for offsetting said plurality of sensors attached to each transmission channel from each other by a second predetermined interval so that no two of said plurality of sensors occupy the same location along each transmission channel;
   (b) means for simultaneously launching a pulse into each of said plurality of transmission channels, said pulse having a known propagation velocity;
   (c) means for directing a known portion of said pulse within each channel into each of said plurality of sensors, said known portion of said pulse reaching each of said plurality of sensors at a time interval determined by the pulse propagation velocity through each of said plurality of transmission channels;
   (d) means for redirecting said known portion of said pulse within each of said sensors back into said channel in an opposite direction in time order of receipt, whereby each known portion of said pulse is time-division multiplexed a first time; and
   (e) means for receiving and recording said known portion of said pulse redirected and time-division multiplexed into each channel from said plurality of sensors in order of their arrival, whereby each known portion of said pulse within each channel is time-division multiplexed a second time according to their arrival time.

8. A telemetric system, comprising:
   (a) a remote recording unit;
   (b) a plurality of transmission channels, each having a predetermined length and operably connected to said remote recording unit;
   (c) first mean disposed along each of said plurality of transmission channels at a first interval from each other for time-division multiplexing a plurality of data pulses propagating therethrough; and (d) second means for time-division multiplexing said data pulses time-division multiplexed on each of said plurality of transmission channels at said remote recording unit.

9. A telemetric system for transmitting data pulses to a remote recording unit, comprising in combination:
 (a) a plurality of transmission channels, each of predetermined length and operably coupled to said remote recording unit;
 (b) a plurality of sensors disposed at a first interval from each other along each of said plurality of transmission channels, said plurality of sensors along each channel staggered with respect to said plurality of sensors along adjacent channels by a second interval such that no two of said plurality of sensors are the same distance along said plurality of transmission channels from said remote recording unit whereby said data pulses from said plurality of sensors are time-division multiplexed a first time along each channel by said first interval and time-division multiplexed a second time at said remote recording unit by said second interval.

* * * * *